US009336607B1

(12) United States Patent
Chang et al.

(10) Patent No.: US 9,336,607 B1
(45) Date of Patent: May 10, 2016

(54) AUTOMATIC IDENTIFICATION OF PROJECTION SURFACES

(71) Applicant: Rawles LLC, Wilmington, DE (US)

(72) Inventors: Samuel Henry Chang, San Jose, CA (US); Ning Yao, Cupertino, CA (US); Sowmya Gopalan, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 463 days.

(21) Appl. No.: 13/687,952

(22) Filed: Nov. 28, 2012

(51) Int. Cl.
*G06K 9/00* (2006.01)
*G06T 7/40* (2006.01)

(52) U.S. Cl.
CPC ........................................ *G06T 7/40* (2013.01)

(58) Field of Classification Search
CPC ....... G06T 19/006; G06T 13/40; G06F 3/011; G06F 8/315; G09G 5/377; G01B 11/2518; G01B 11/2545
See application file for complete search history.

(56) References Cited

U.S. PATENT DOCUMENTS

| 2010/0030578 | A1* | 2/2010 | Siddique et al. ................... 705/3 |
| 2011/0025689 | A1* | 2/2011 | Perez et al. ..................... 345/420 |
| 2012/0223885 | A1 | 9/2012 | Perez |
| 2013/0215116 | A1* | 8/2013 | Siddique et al. .............. 345/420 |
| 2014/0125654 | A1* | 5/2014 | Oh ................................. 345/419 |

FOREIGN PATENT DOCUMENTS

WO   WO2011088053 A2   7/2011

OTHER PUBLICATIONS

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

* cited by examiner

*Primary Examiner* — Ali Bayat
(74) *Attorney, Agent, or Firm* — Lee & Hayes, PLLC

(57) ABSTRACT

Techniques are described for identifying suitable surfaces within a room upon which visual content may be displayed. One or more images of the room are obtained and used to identify planar surfaces. The images may also be analyzed to determine the visual textures of the surfaces within the room. Suitable projection surfaces may then be selected from the identified planar surfaces, based on the visual textures of the planar surfaces.

19 Claims, 2 Drawing Sheets

AUTOMATIC IDENTIFICATION OF PROJECTION SURFACES

BACKGROUND

Digital content, such as movies, images, books, interactive content, and so on, may be displayed and consumed in various ways. In some situations, it may be desired to display content on passive surfaces within a room or other environment. For example, it may be desired to display visual content on walls, tabletops, whiteboards, and so forth.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

This disclosure describes a systems and techniques for interacting with users using passive elements of an environment. For example, various types of content may be projected onto a passive surface within a room, such as a wall, the top of a table or a handheld sheet. Content may include images, video, pictures, movies, text, books, diagrams, Internet content, user interfaces, and so forth.

Suitable projection surfaces within the room may be identified automatically, based on captured images of the room. The captured images may include depth images and visual images. Depth images may be analyzed to detect planar surfaces within the room. Visual images may be analyzed to detect visual textures of the surfaces. Based on these analyses, suitable surfaces may be identified and nominated for use as projection surfaces. In some cases, one of the suitable surfaces may be automatically selected based on predetermined criteria such as size or location. For example, the largest suitable planar surface within the room may be automatically selected, and the content may be automatically displayed on that surface.

Figure 1:
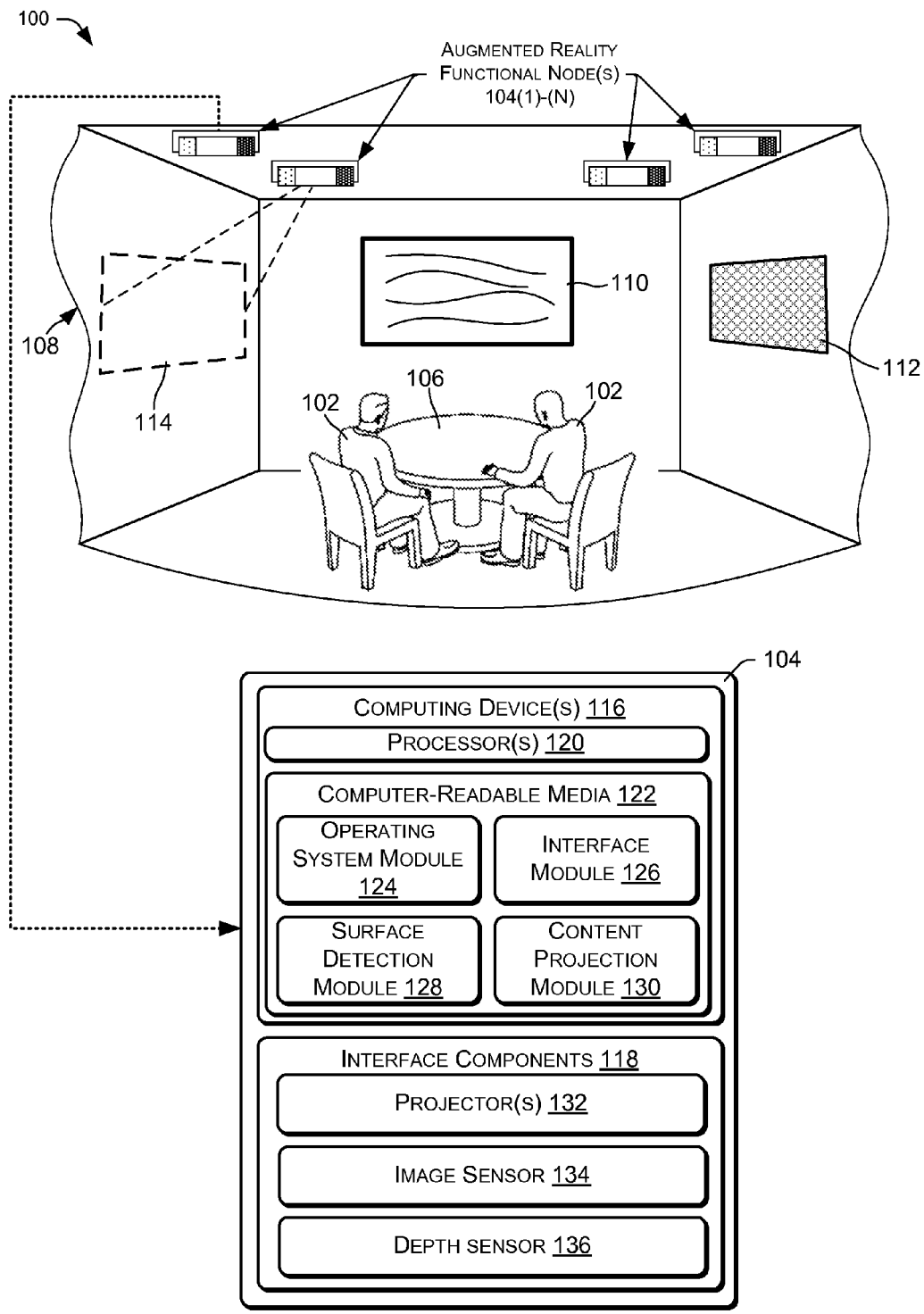
FIG. 1 illustrates a user environment that includes an augmented reality functional node (ARFN) configured to project content onto a projection surface.

FIG. 1 illustrates an example room or environment 100 in which one or more users 102 view content that is projected onto a passive display area or surface within the room 100. The content may be generated and projected by one or more augmented reality functional nodes (ARFNs) 104(1), ..., 104(N) (collectively referred to as "the ARFN 104" in some instances). It is to be appreciated that the techniques described herein may be performed by a single ARFN, by a collection of any number of ARFNs, or by other devices or combinations of devices.

The projected content may include any sort of multimedia content, such as text, color images or videos, games, user interfaces, or any other visual content. In some cases, the projected content may include interactive content such as menus, controls, and selectable or controllable objects.

Different parts or surfaces of the environment may be selected as projection areas, such as walls of the environment 100, surfaces of other objects within the environment 100, and passive display surfaces or media held by users 102 within the environment 100. The location of the selected projection area may change from time to time, depending on circumstances and/or in response to user instructions. In addition, a particular projection area, such as a projection area formed by a handheld surface, may be in motion as a user 102 moves within the environment 100.

In the example shown, potential display surfaces may include a tabletop 106, a wall 108, and a whiteboard 110. In addition to the potential projection surfaces shown in FIG. 1 content may in some embodiments be displayed on a handheld media, such as a white sheet or other object held by a user.

As an example of a surface that may not be suitable for the projection of content, the room 100 of FIG. 1 also includes a picture, painting, or other wall hanging 112. This surface may be unsuitable for use as a projection surface because of its high degree of texture.

In the illustrated example, a portion of the wall 108 has been selected as a current projection area 114, based on methods and criteria that will be described in more detail below.

Each ARFN 104 may include one or more computing devices 116, as well as one or more interface components 118. The computing devices 116 and interface components 118 may be configured in conjunction with each other to interact with the users 102 within the environment 100. In particular, the ARFN 104 may be configured to project content onto a selected passive projection surface within the room 100 for viewing by the users 102. In this case, the selected projection area 114 comprises all or a portion of the wall 108.

The computing device 116 of the example ARFN 104 may include one or more processors 120 and computer-readable media 122. The processors 120 may be configured to execute instructions, which may be stored in the computer-readable media 122 or in other computer-readable media accessible to the processors 120. The processor(s) 120 may include digital signal processors (DSPs), which may be used to process audio signals and/or video signals.

The computer-readable media 122 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by the computing device 116. The computer-readable media 122 may reside within a housing of the ARFN, on one or more storage devices accessible on a local network, on cloud storage accessible via a wide area network, or in any other accessible location.

The computer-readable media 122 may store various modules, such as instructions, datastores, and so forth that are configured to execute on the processors 120. For instance, the computer-readable media 122 may store an operating system module 124 and an interface module 126.

The operating system module 124 may be configured to manage hardware and services within and coupled to the computing device 116 for the benefit of other modules. The interface module 126 may be configured to receive and interpret commands received from users 102 within the room 100, and to respond to such commands in various ways as determined by the particular environment.

In addition to other functional modules not shown, the computer-readable media 122 may include a surface detection module 128. The surface detection module 128 may be configured to evaluate different areas or surfaces of the room 100 to identify one or more surfaces that may be suitable as projection surfaces for projected content As will be described in more detail below with respect to FIG. 2, the surface detection module may be configured to analyze shape characteristics and visual characteristics of different surfaces of the room 100 in order to identify surfaces that are appropriate for the display of projected content.

Shape characteristics may be determined based on three-dimensional (3D) data regarding surfaces within the room 100, such as depth maps or images. In particular, a depth map may be analyzed to detect planar surfaces within the room 100.

Visual characteristics of room surfaces may be determined based on two-dimensional (2D) visual or optical images of the environment. Visual characteristics may include visible textures of the surfaces. Surfaces exhibiting high visual textures may be unsuitable for use as projection surfaces.

The computer-readable media 122 may additionally include a content projection module 130 that is executable to project content onto a selected projection area, such as the projection area 114 shown in FIG. 1. The projection module 130 may receive an indication of the selected projection area from the surface detection module 128, and may manipulate the projected content so that it appears correctly on the selected projection area after accounting for the size, position, and orientation of the selected projection area. For example, the projection module 130 may vary the size, location, orientation and aspect ratio of a projected image. The projection module 130 may also use techniques such as keystone correction to correct the appearance of a projected image in situations where the projection source is not aligned with the projection area. For example, the projected image may be intentionally distorted to account for a non-perpendicular alignment of the projection area with respect to the projection source.

The computer-readable media 122 may contain other modules, which may be configured to implement various different functionality of the ARFN 104.

The ARFN 104 may include various interface components 118, such as user interface components and other components that may be used to detect and evaluate conditions and events within the environment 100. As examples, the interface components 118 may include one or more projectors 132. The projector(s) 132 may be used to project content onto a selected projection surface within the room 100, for viewing by the users 102. The projector(s) 132 may comprise a microlaser projector, a digital light projector (DLP), cathode ray tube (CRT) projector, liquid crystal display (LCD) projector, light emitting diode (LED) projector or the like.

The projector(s) 132 may be configured to be directed by the content projection module 130 in different directions, to project content onto different areas or surfaces of the room 100. The direction of projection may be performed by selecting from multiple projectors 132 or multiple ARFN nodes 104, by physically panning the projector(s) 132 using electronic and/or physical actuators, or by other means. Various types of image manipulation may also be performed by or in conjunction with the projector(s) 132 in order to correctly display the content on a selected projection area.

The interface components 118 may also include one or more cameras or other imaging components. In the embodiment described herein, such imaging components are also used to analyze the room 100 to detect one or more surfaces upon which to project content.

The imaging components may include a visual image sensor or component 134 and a depth sensor or component 136. The visual image sensor 134 may comprise an optical camera that produces 2D optical images of the room 100 or portions of the room 100. Such images may comprise color images, grey scale images, and/or monochrome images. A 2D optical image may comprise a 2D array of pixels, in which each pixel corresponds to a surface point within the room 100 and indicates a color, shade, and/or intensity of the surface point.

The depth sensor 136 may produce depth maps of the room 100 or portions of the room 100. A depth map may comprise a 2D array of pixels, in which each pixel corresponds to a surface point within the room 100 and indicates the distance of the surface point from the depth sensor or from some other observation point.

Both the visual image sensor 134 and the depth sensor 136 may be capable in some embodiments of zooming, panning, rotating, and so forth to analyze different portions of the room 100. In addition, multiple imaging components and/or multiple ARFNs 104 may be used to obtain image and depth information for different parts of the room 100.

The interface components 118 may in certain implementations include various other types of sensors and transducers, content generation devices, and so forth, including microphones, speakers, and other devices.

In addition to the uses described above, the imaging components 134 and 136 may be used for various other types of scene analyses, such as by using shape analysis to detect and identify objects within the environment 100.

The computer-readable media 122 may contain other modules, which may be configured to implement various different functionality of the ARFN 104.

The coupling between the computing device 116 and the interface components 118 may be via wire, fiber optic cable, wireless connection, or the like. Furthermore, while FIG. 1 illustrates the computing device 116 as residing within a housing of the ARFN 104, some or all of the components of the computing device 116 may reside at another location that is operatively connected to the ARFN 104. In still other instances, certain components, logic, and/or the like of the computing device 116 may reside within a projector or camera. Therefore, it is to be appreciated that the illustration of the ARFN 104 of FIG. 1 is for illustrative purposes only, and that components of the ARFN 104 may be configured in any other combination and at any other location.

Furthermore, additional resources external to the ARFN 104 may be accessed, such as resources in another ARFN 104 accessible via a local area network, cloud resources accessible via a wide area network connection, or a combination thereof. In still other instances, the ARFN 104 may couple to and control other devices within the environment, such as televisions, stereo systems, lights, and the like.

In other implementations, the components of the ARFN 104 may be distributed in one or more locations within the environment 100. For example, the camera(s) and projector(s) may be distributed throughout the environment and/or in separate chasses.

In operation, the surface detection module 128 is responsive to images obtained from the image sensor 134 and the depth sensor 136 to identify one or more suitable surfaces upon which to project content. In response to depth information, the surface detection module 128 identifies planar surfaces within the room 100. In response to visual information, the surface detection module determines which of the identified planes exhibit relatively low visual texture. Based on this information, the surface detection module 128 selects an area or surface that is both planar and that is relatively free from visual texture.

Figure 2:
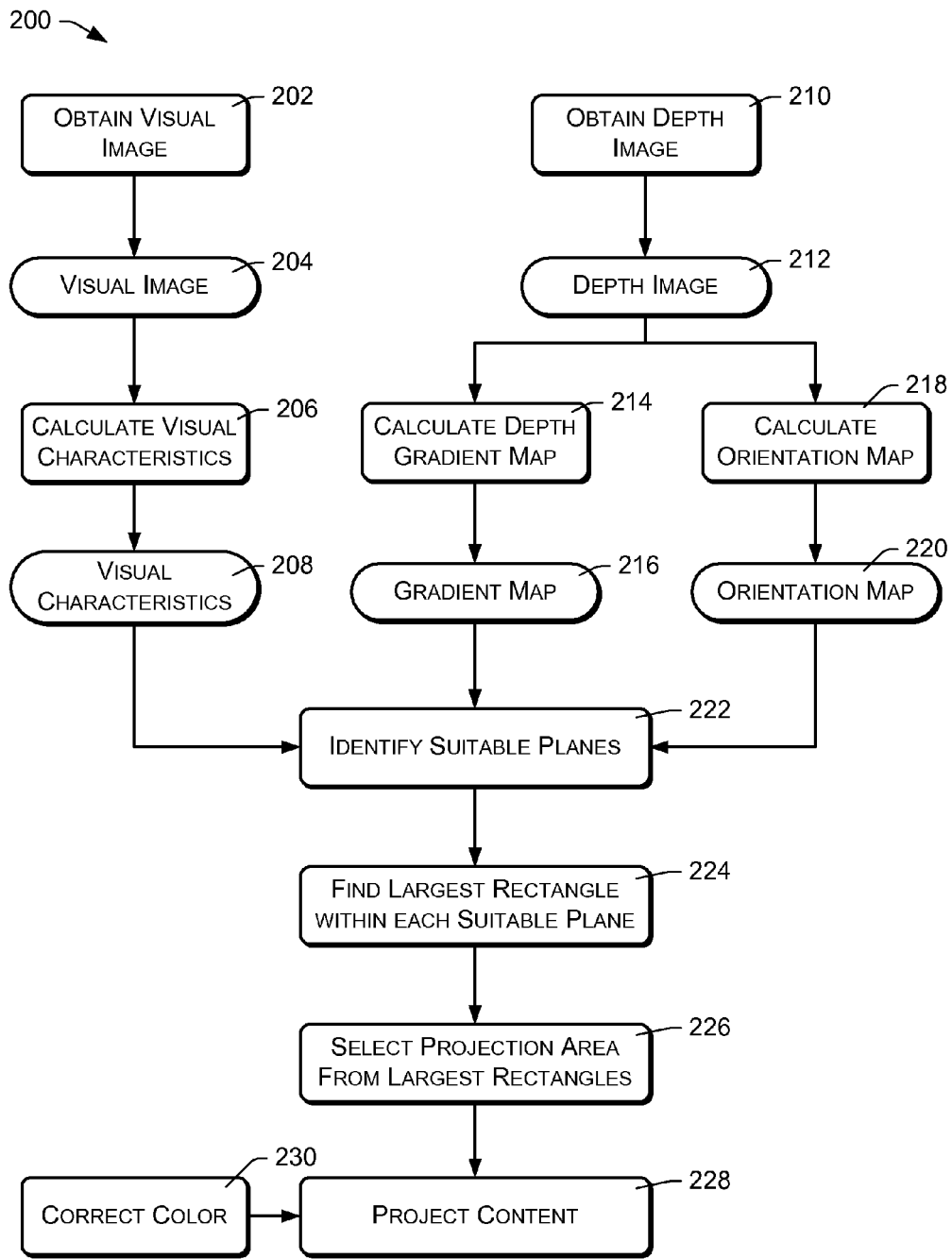
FIG. 2 is a flow diagram of an ARFN recognizing selecting a projection surface based on evaluated properties of observed surfaces within the user environment.

FIG. 2 illustrates an example method 200 of selecting a surface of the room 100 for projection of visual content. Although the example method 200 is described in the context of the environment 100, the described techniques, or portions of the described techniques, may be employed in other environments and in conjunction with other methods and processes.

An action 202 comprises receiving or obtaining one or more visual images 204. The visual images may be obtained using the visual image sensor 134. Each visual image 204 may comprise a 2D array of color or color-related values. For example, each pixel or element of the 2D array may comprise intensities, shades, hues, color component intensities, or other visual properties, corresponding to an observed surface point of the room 100. The one or more visual images 204 may represent surfaces of all or parts of the room 100.

An action 206 comprises calculating visual characteristics 208, based at least in part on the visual image 204. The visual characteristics may include a texture map that indicates visual texture of surfaces represented by the visual image 204. Surfaces of a uniform color will generally exhibit low textures. Surfaces of non-uniform color will generally exhibit high textures. Surfaces having low texture are considered relatively more suitable as surfaces upon which visual content may be projected.

For example, the whiteboard 110 may have little or no observable texture when it contains no writing. However, the same whiteboard 110 may exhibit a relatively high texture when it contains markings or writings.

As another example, a painting or wall hanging 112 may exhibit a relatively high texture, corresponding to a low degree of color or shade uniformity. Accordingly, the painting or wall hanging 112 may be evaluated as being relatively unsuitable as a projection area.

As yet another example, the tabletop 106 may in some cases exhibit a low texture, particularly when articles have not been placed upon the table.

The wall 108 in this example is relatively clear of visual features, and thus exhibits little or no visible texture. Accordingly, the wall 108 may be evaluated as being suitable for use as a projection area.

The texture map may be calculated using feature detection, edge detection, gradient mapping, and/or other techniques. The texture map may in some embodiments comprise a 2D array of values, in which each value indicates either the presence or absence of a visible edge or feature at a corresponding surface point of the room 100. Various types and degrees of smoothing or filtering may be performed with respect to the visual image 204 and/or the texture map in order to introduce a degree of tolerance for minor or insignificant textures.

In addition to texture, the visual characteristics 208 may also indicate color, hue, shade, reflectivity, and other properties of surfaces within the room 100, which may have an impact on the quality of projection. For example, dark or colored surfaces may be relatively unsuitable for the projection of content. Likewise, highly reflective surfaces may not be appropriate as display surfaces.

An action 210 may comprise receiving or obtaining one or more depth images 212. The depth images may be obtained using the depth sensor 136. Each depth image 212 may comprise a 2D array of depth or depth-related values. For example, each pixel or element of the 2D array may comprise a distance of the corresponding surface point within the environment 100 relative to the depth sensor 136.

An action 214 may comprise calculating a depth gradient map 216 based at least in part on the depth image 212, wherein the depth gradient map 216 indicates relative distances of observed surface points from neighboring surface points. The depth gradient map 216 may comprise a 2D array of gradient values, wherein the gradient value corresponding to a particular surface point within the environment 100 indicates the difference in distance between that surface point and its neighboring surface points. In some cases, the gradient map may be based on a vector map produced from the depth image 212.

An action 218 may comprise calculating an orientation map 220, based at least in part on the depth image 212. The orientation map 220 may comprise a 2D array of orientation values, wherein the orientation value corresponding to a particular surface point within the environment 100 indicates the surface normal at that point. In other words, each orientation value may be a vector indicating the orientation of the surface at the corresponding surface point of the room 100.

Planar surfaces may be identified based at least on part on one or more of the gradient map 216 and/or the orientation map 220.

As an alternative to the techniques described above, planar surfaces may be identified based on an iterative RANSAC (random sample consensus) technique. RANSAC is used to estimate the parameters that best fit a data set corresponding to a model. In the situation described herein, RANSAC may be performed iteratively, with each iteration estimating the largest plane found in the depth information corresponding to the room 100.

An action 222 comprises identifying one or more suitable planes within the environment 100. A suitable plane is a surface of the room 100 that is planar and that has relatively low texture and suitable color characteristics. Identifying suitable planes may be based at least on part on one or more of the visual characteristic 208, the gradient map 216, and/or the orientation map 220. For example, the action 222 may comprise identifying all planes within the room 100 that have a size larger than a predefined threshold, based on the gradient map 216 and/or the orientation map 220. The action 222 may further include determining or identifying areas within the identified planes that have relatively low texture, based on the texture map of the visual characteristics 208. In some embodiments, the textures of individual planes may be compared to a predetermined texture threshold, and only those planes whose texture is below the threshold are considered as being suitable projection surfaces. The predetermined threshold may be determined based on experimentation and/or through user testing.

The action 222 may further be based on visual characteristics such as color, shade, hue, brightness, reflectivity, and so forth.

An action 224 may comprise finding the largest rectangular area of a given aspect ratio that can be fitted within each of the identified suitable planes. Each of these rectangles may be considered or nominated as a candidate for the actual projection area. In certain embodiments, areas other than rectangles may be identified in the action 224 for use as projection areas.

An action 226 may comprise selecting the projection area from the rectangles or other areas identified in the action 224. The selection 226 may be made based on various factors, such as the locations, height, size, orientation, aspect ratio, and so forth of the identified surfaces and/or the identified rectangles. For example, larger surfaces or rectangles may receive higher priority than smaller surfaces or rectangles.

Similarly, surfaces or rectangles limited to areas near the floor or other unworkable areas of the room 100 may be rejected.

In some implementations, nominated or candidate projection areas may be displayed or indicated to the user, and the user may select from available surfaces. For example, each of the rectangles may be highlighted by projecting an outline around them, and the user may indicate a selection from the available rectangles.

In yet further implementations, candidate projection areas may be selected, and may be tested or evaluated by projecting a uniform image such as white light upon them. A particular candidate projection area may then be evaluated by examining an image of the candidate area while the light is being projected upon it. After evaluating multiple candidate projection areas, the one that gives the best response may be chosen as the projection area. For example, the candidate projection area that is the whitest and brightest may be selected as the final projection area.

Furthermore, a ranking scheme may be used in some embodiments, based on various factors relevant to surface selection as described above. Different weights may be given to different factors, and final selection of the projection area may then be based on a combination of these weighted factors. Factors may include size, location, texture, color, hue, shade, reflectivity, distance from the user, and so forth.

An action 228 may comprise projecting the content on the selected projection area. In conjunction with projecting the content, an action 230 may be performed, comprising adjusting the overall color of the projected image to account for colors or textures of the selected projection surface, based in part in the visual image 204 obtained in the action 202 and/or the texture map 206.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
one or more processors;
an image sensor;
a depth sensor;
a projector;
one or more non-transitory computer-readable media storing computer-executable instructions that, when executed by the one or more processors, cause the one or more processors to perform acts comprising:
obtaining a depth image of a room using the depth sensor, wherein the depth image indicates distances of surface points of the room from the depth sensor;
calculating a gradient map based at least in part on the depth image, wherein the gradient map indicates relative distances of the surface points from neighboring surface points;
calculating an orientation map based at least in part on the depth image, wherein the orientation map indicates surface orientations at the surface points;
identifying one or more planar surfaces within the room based at least in part on the gradient map and the orientation map;
obtaining a visual image of the room using the image sensor;
calculating a visual texture map based at least in part on the visual image, wherein the visual texture map indicates visible textures of surfaces within the room;
selecting a projection surface from the one or more identified planar surfaces based at least in part on the visual textures of the identified planar surfaces indicated by the visual texture map; and
projecting content onto the projection surface using the projector.

2. The system of claim 1, wherein selecting the projection surface comprises identifying one of the identified planar surfaces having relatively low visible texture.

3. The system of claim 1, wherein selecting the projection surface comprises selecting one of the identified planar surfaces having visible texture that is below a predetermined threshold.

4. The system of claim 1, further comprising adjusting the projected content to compensate for a color or shade of the projection surface.

5. The system of claim 1, wherein selecting the projection surface is based at least in part on sizes of the identified planar surfaces.

6. The system of claim 1, wherein selecting the projection surface is based at least in part on sizes of rectangular areas that can be fitted within the identified planar surfaces.

7. A method, comprising:
obtaining one or more images of a user environment;
generating a gradient map that indicates a distance of one or more surface points of the user environment and one or more neighboring surface points of the user environment;
identifying one or more planar surfaces of the user environment based at least in part on the gradient map;
evaluating visual characteristics of one or more surfaces of the user environment based at least in part on the one or more images;
selecting a projection surface from the one or more identified planar surfaces based at least in part on the evaluated visual characteristics; and
projecting content onto the projection surface, the projection surface comprising a physical surface in the user environment.

8. The method of claim 7, wherein the visual characteristics comprise one or more of:
color;
hue;
shade;
texture;
reflectivity;
whiteness; or
brightness.

9. The method of claim 7, further comprising:
adjusting the projected content to compensate for a color or shade of the projection surface.

10. The method of claim 7, wherein evaluating the visual characteristics comprises calculating a texture map based at least in part on the one or more images.

11. The method of claim 7, wherein selecting the projection surface is further based at least in part on one or more of:
sizes of the identified planar surfaces;
locations of the identified planar surfaces; or
heights of the identified planar surfaces.

12. The method of claim 7, wherein the one or more images comprise a visual image and a depth image.

13. The method of claim 12, wherein evaluating the visual characteristics comprises analyzing the visual image.

14. The method of claim 12, wherein identifying the one or more planar surfaces comprises analyzing the depth image.

15. One or more non-transitory computer-readable media storing computer-executable instructions that, when executed by one or more processors, cause the one or more processors to perform acts comprising:
- obtaining a depth image of a user environment;
- generating a gradient map that indicates a distance of one or more surface points of the user environment and one or more neighboring surface points of the user environment;
- identifying one or more planar surfaces of the user environment based at least in part on the gradient map;
- obtaining a visual image of the user environment;
- selecting a projection surface from the one or more identified planar surfaces based at least in part on the visual image; and
- projecting content onto the projection surface, the projection surface comprising a physical surface in the user environment.

16. The one or more computer-readable media of claim 15, wherein selecting the projection surface is based at least in part on one or more visual characteristics of the planar surfaces, the visual characteristics comprising one or more of:
- color;
- hue;
- shade;
- texture;
- reflectivity;
- whiteness; or
- brightness.

17. The one or more computer-readable media of claim 15, wherein the depth image indicates distances of individual surface points of the room from an observation location.

18. The one or more computer-readable media of claim 15, wherein selecting the projection surface is based at least in part on one or more of:
- sizes of the identified planar surfaces;
- locations of the identified planar surfaces; or
- heights of the identified planar surfaces.

19. The one or more computer-readable media of claim 15, the acts further comprising evaluating visual textures of the identified planar surfaces based at least in part on the visual image, wherein selecting the projection surface is based at least in part on the evaluated visual textures of the identified planar surfaces.

* * * * *

UNITED STATES PATENT AND TRADEMARK OFFICE
CERTIFICATE OF CORRECTION

PATENT NO. : 9,336,607 B1  
APPLICATION NO. : 13/687952  
DATED : May 10, 2016  
INVENTOR(S) : Samuel Henry Chang et al.

Page 1 of 1

It is certified that error appears in the above-identified patent and that said Letters Patent is hereby corrected as shown below:

On the Title Page, change: (71) Applicant: Rawles LLC, Wilmington, DE (US)

to:

(71) Applicant: Amazon Technologies, Inc., Seattle, WA (US)

Signed and Sealed this  
Twenty-eighth Day of June, 2016

Michelle K. Lee  
*Director of the United States Patent and Trademark Office*